(12) United States Patent
Warren

(10) Patent No.: US 6,400,800 B1
(45) Date of Patent: Jun. 4, 2002

(54) TWO-STEP BRAZED X-RAY TARGET ASSEMBLY

(75) Inventor: John M. Warren, North Reading, MA (US)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 0 days.

(21) Appl. No.: 09/752,190

(22) Filed: Dec. 29, 2000

(51) Int. Cl.⁷ .............................................. H01J 35/10
(52) U.S. Cl. ........................................ 378/144; 378/143
(58) Field of Search ................................. 378/144, 143, 378/128, 127

(56) References Cited

U.S. PATENT DOCUMENTS

| | | | |
|---|---|---|---|
| 4,352,041 A | * | 9/1982 | Hübner et al. ............... 378/144 |
| 4,597,095 A | * | 6/1986 | Akpan ......................... 378/144 |
| 4,689,810 A | * | 8/1987 | Devine, Jr. .................. 378/144 |
| 4,777,643 A | * | 10/1988 | Devine, Jr. .................. 378/144 |
| 4,802,196 A | * | 1/1989 | Tiearney, Jr. et al. ....... 378/143 |
| 5,008,918 A | * | 4/1991 | Lee et al. .................... 378/144 |
| 5,102,747 A | * | 4/1992 | Kneringer et al. ........... 428/634 |
| 5,122,422 A | * | 6/1992 | Rodhammer et al. ....... 428/634 |
| 5,234,152 A | * | 8/1993 | Glaeser ....................... 228/121 |

* cited by examiner

Primary Examiner—Robert H. Kim
Assistant Examiner—Glen Kao

(57) ABSTRACT

A joining method designed to minimize the temperature needed to obtain a high strength braze joint between a molybdenum alloy substrate and a graphite disk used in a rotating anode X-ray tube target used for computed tomography applications. The method consists of two separate brazing operations. The first brazing operation joins a thin molybdenum sheet to the graphite disk using a pure metal braze to form a plated graphite subassembly. The second brazing operation joins the plated graphite subassembly to the molybdenum alloy substrate using a highly specialized braze alloy having a melt temperature below the recrystallization temperature of said molybdenum alloy substrate and a remelt temperature after brazing above the recrystallization temperature of said molybdenum alloy substrate. This two step brazing reduces the probability of fracture in the graphite by maintaining the elevated temperature yield strength normally developed in forged molybdenum alloy substrates by avoiding the deleterious yield strength reduction associated with recrystallization of the molybdenum alloy substrate.

7 Claims, 3 Drawing Sheets

TWO-STEP BRAZED X-RAY TARGET ASSEMBLY

TECHNICAL FIELD

The present invention relates generally to a radiography device and, more particularly, to a two-step brazed x-ray target assembly for a radiography device.

BACKGROUND ART

The X-ray tube has become essential in medical diagnostic imaging, medical therapy, and various medical testing and material analysis industries. Typical X-ray tubes are built with a rotating anode structure for the purpose of distributing the heat generated at the focal spot. The anode is rotated by an induction motor consisting of a cylindrical rotor built into a cantilevered axle that supports the disc-shaped anode target, and an iron stator structure with copper windings that surrounds the elongated neck of the X-ray tube that contains the rotor. The rotor of the rotating anode assembly being driven by the stator which surrounds the rotor of the anode assembly is at anodic potential while the stator is referenced electrically to the ground. The X-ray tube cathode provides a focused electron beam that is accelerated across the anode-to-cathode vacuum gap and produces X-rays upon impact with the anode.

In an X-ray tube device with a rotatable anode, the target has previously consisted of a disk made of a refractory metal such as tungsten, and the X-rays are generated by making the electron beam collide with this target, while the target is being rotated at high speed. Rotation of the target is achieved by driving the rotor provided on a support shaft extending from the target. Such an arrangement is typical of rotating X-ray tubes and has remained relatively unchanged in concept of operation since its induction.

However, the operating conditions for X-ray tubes have changed considerably in the last two decades. Due to continuous demands from radiologists for higher power from X-ray tubes, more and more tubes are using composite rotating anodes with tungstenrhenium as a focal spot layer, molybdenum alloy (typically TZM) as a substrate, and brazed graphite as a heat sink.

The higher power levels increase the operating temperatures of the anode which, if high enough, may result in elevated temperature plastic hoop strain deformation of the molybdenum alloy substrate. The magnitude of the strains increases as the center of the anode is approached. Large hoop strains may induce stress in the metallurgical bond between the alloy substrate and the graphite heat sink. The magnitude of this stress imposes a limit on the maximum size, rotational speed and highest allowable temperature of the alloy substrate. Should the stress exceed a threshold value, a complete debond of the graphite heat sink can result.

The metallurgical bond made between a TZM substrate and the graphite heat sink is accomplished by elevated temperature brazing, which can be as high as 1900 degrees Celsius. Prior to brazing, the TZM substrate is typically forged to a final shape that greatly enhances the strength of the material. However, during the high temperature brazing process, this strength increase may be lost due to metallurgical transformation, or recrystallization, in the TZM, which takes place near or above 1400 degrees Celsius.

It would be desirable to have an improved X-ray tube target design which would reduce the heat needed in the brazing step to attach a molybdenum alloy substrate cap to the graphite disk to overcome problems associated with prior art structures and for improving the power limits of advanced X-ray tubes.

SUMMARY OF THE INVENTION

The present invention provides an improved joining method between a molybdenum alloy substrate cap and a graphite disk used in x-ray tube targets for computed tomography applications.

Two interrelated brazing operations are used to join the molybdenum alloy cap, typically TZM, to the graphite disk. A first brazing step joins a thin molybdenum alloy sheet to the graphite disk using either a pure zirconium or pure titanium braze to form a "plated" graphite subassembly. A second brazing step joins the plated subassembly to the molybdenum alloy substrate cap using a select group of highly specialized brazed alloys to form a final assembly.

These highly specialized brazed alloys are designed to have melt temperatures below the recrystallization temperature of the molybdenum alloy substrate (about 1400 degrees Celsius) and a remelt temperature after brazing, due to the diffusion of molybdenum into the braze joint, at or near 1700 degrees Celsius. High remelt is critical to fully exploit the advantage of using a molybdenum alloy substrate for rotating anode applications. By reducing the temperature that the molybdenum alloy substrate is exposed to in the brazing steps, recrystallization of the molybdenum alloy substrate is avoided, resulting in higher yield strengths for the molybdenum substrate. These higher yield strength molybdenum substrates exhibit lower rotation hoop strains at the substrate/graphite interface that reduces the possibility of tube failure by reducing the possibility of fracture in the graphite disk.

Other objects and advantages of the present invention will become apparent upon the following detailed description and appended claims, and upon reference to the accompanying drawings.

DETAILED DESCRIPTION OF THE PREFERRED EMBODIMENT

Figure 1:
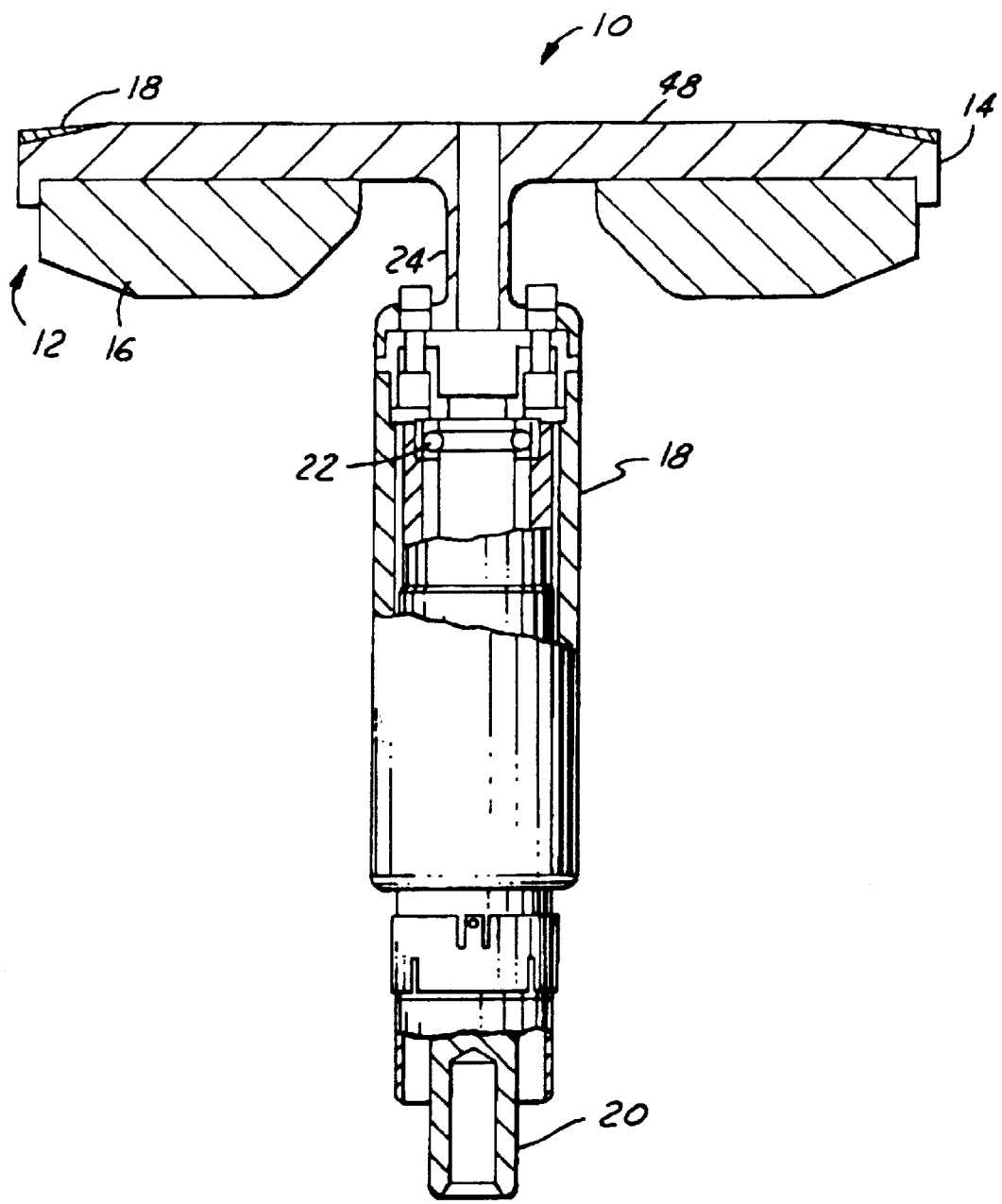
FIG. 1 is a cross-sectional view of an X-ray tube constructed in accordance with the prior art.

In the following figures, the same reference numerals are used to identify the same components. The present invention relates to a computed tomography system having rotating X-ray tubes that employ a rotating anode system and a cathode assembly.

Referring now to the drawings, FIG. 1 illustrates an X-ray tube anode 10 having a rotating anode assembly 12 according to the prior art. The anode assembly 12 is rotated by a bearing shaft 20, which supports a disc shaped target 14, typically comprising a tungsten-rhenium area 18 for generating X-rays, a molybdenum alloy substrate 48 for structural support, and a graphite disk 16 operating as a heat sink. The target 14 is connected via the stem 24 to the bearing shaft 20, which is supported by bearings 22 facilitating rotation. The graphite disk 16 is joined to the molybdenum alloy substrate 48 by using a braze alloy (not shown) consisting of either pure titanium, pure zirconium, or alloys with titanium and zirconium as a base. The end of bearing shaft 20 is attached to a rotor (not shown) driven by a stator (not shown) of an induction motor (not shown). The entire rotating assembly 12 is at anodic potential while the stator is referenced electrically to ground.

In a typical assembly, the rotating anode assembly 12 and a cathode assembly (not shown) are sealed in a vacuum envelope (either glass or brazed metal construction) and mounted in a conductive metal housing (not shown). The rotating anode assembly 12, the stator, and the vacuum envelope are insulated electrically from each other. A typical X-ray tube anode 10 further comprises a X-ray tube cathode assembly (not shown) for providing a focused electron beam that is accelerated across a large anode-to-cathode vacuum gap, thereby producing X-rays upon impact with the anode.

One problem with X-ray tube anodes 10 in the prior art is that the temperature needed to obtain a high strength braze joint between the molybdenum alloy substrate 48 and graphite disk 16 is higher than the recrystallization temperature of the molybdenum alloy substrate 48. Recrystallization decreases the elevated temperature yield strength of the molybdenum alloy substrate 48 that is imparted into the molybdenum alloy substrate 48 during forging fabrication. The elevated temperature yield strength is a physical property that places a limit on the X-ray power generated by the tube. A higher yield strength enables a higher rotational speed, anode size, or operating temperature, or a combination of all three.

The present invention proposes a method for minimizing the temperature needed to obtain a high strength braze joint between the molybdenum alloy substrate 48 and the graphite disk 16 and thus avoid the deleterious strength consequences of recrystallization.

Figure 2:
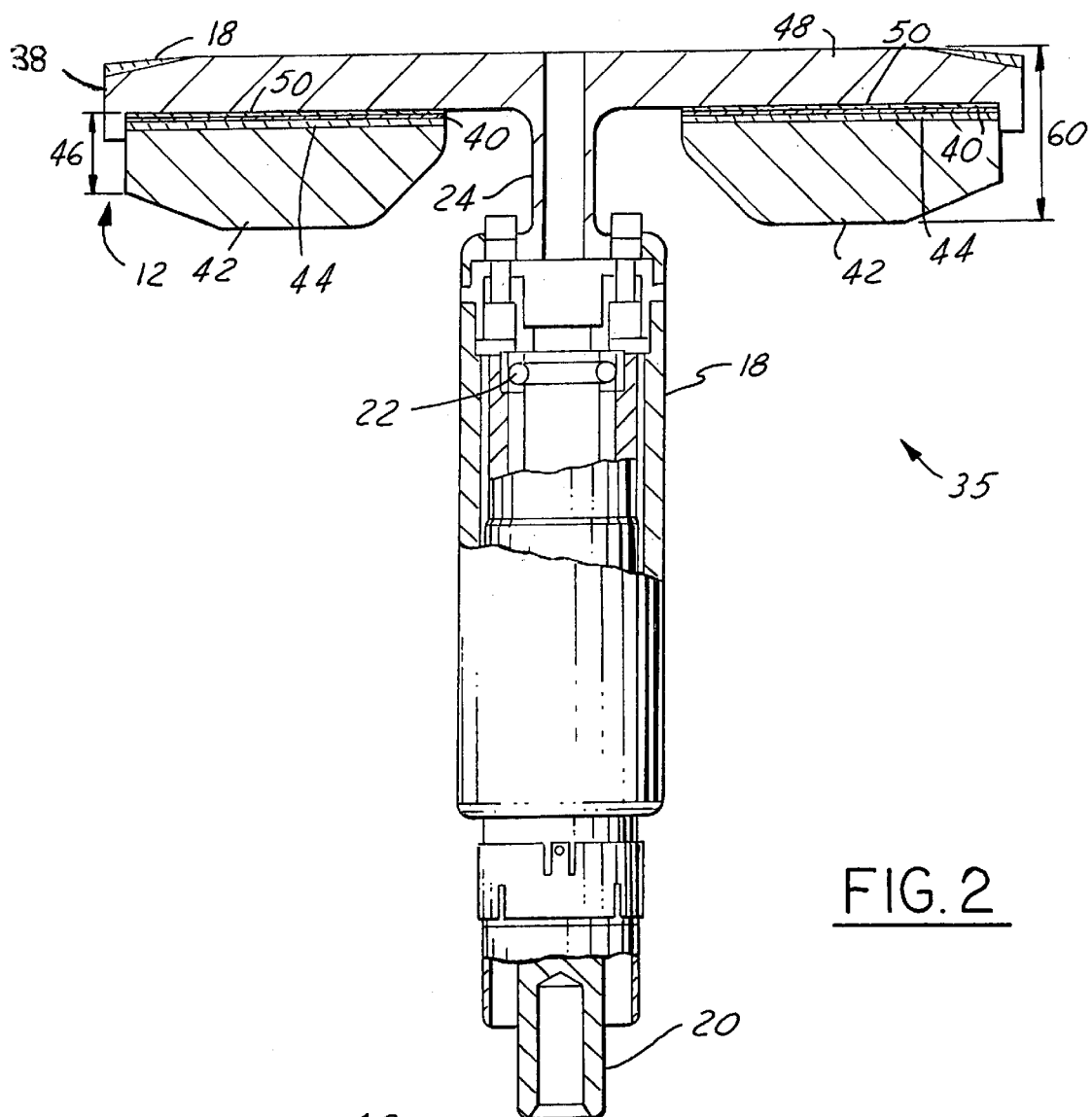
FIG. 2 is a cross-sectional view of an X-ray tube constructed in accordance with the present invention.

As shown in FIG. 2, an X-ray tube anode 35 having a rotating anode assembly 12 according to the present invention is shown. The X-ray tube anode 35 is rotated by a bearing shaft 20, which supports a disk shaped target 38. The target 38 has a tungsten-rhenium area 18 for generating X-rays, a molybdenum alloy substrate 48 for structural support, and a graphite disk 42 as a heat sink. The target 38 is connected via the stem 24 to the bearing shaft 20, which is supported by bearings 22 facilitating rotation. The target 38 is typically welded to the stem 24 using a brazed alloy. Alternatively, the target 38 may be bolted to the stem 24. The end of bearing shaft 20 is attached to a rotor (not shown) driven by a stator (not shown) of an induction motor (not shown). The entire rotating assembly 12 is at anodic potential while the stator is referenced electrically to ground. A close-up view for coupling the molybdenum alloy substrate 48 to the graphite disk 42 to form a anode target assembly 60 is shown below in FIG. 3, and a description of the process for making the anode target assembly 60 is shown in FIG. 4.

As in the assembly of FIG. 1, the rotating anode assembly 12 and a cathode assembly (not shown) are sealed in a vacuum envelope (either glass or brazed metal construction) and mounted in a conductive metal housing (not shown) The rotating anode assembly 12, the stator, and the vacuum envelope are insulated electrically from each other. A typical X-ray tube anode 35 further comprises a X-ray tube cathode assembly (not shown) for providing a focused electron beam that is accelerated across a large anode-to-cathode vacuum gap and producing X-rays upon impact with the anode.

Figure 3:
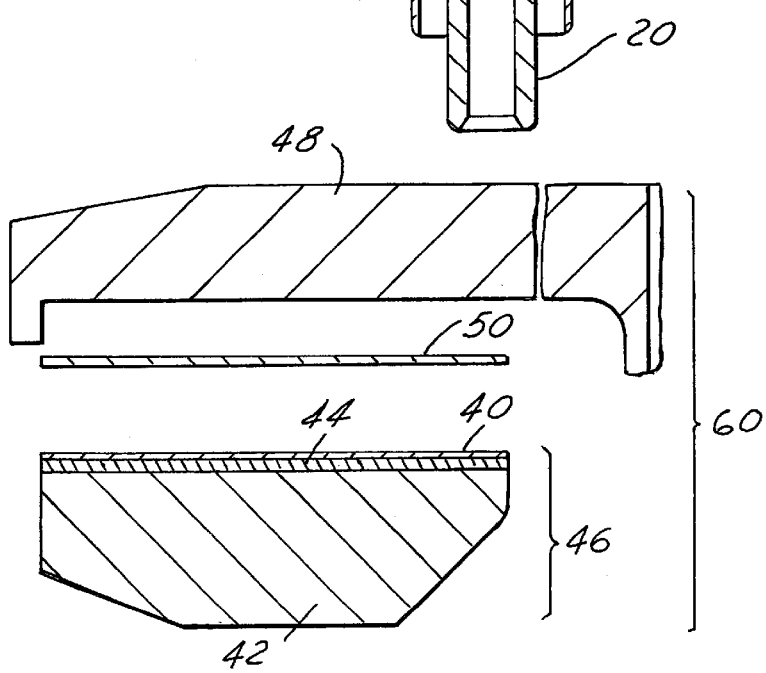
FIG. 3 is an exploded view of the anode target assembly of FIG. 2.
Figure 4:
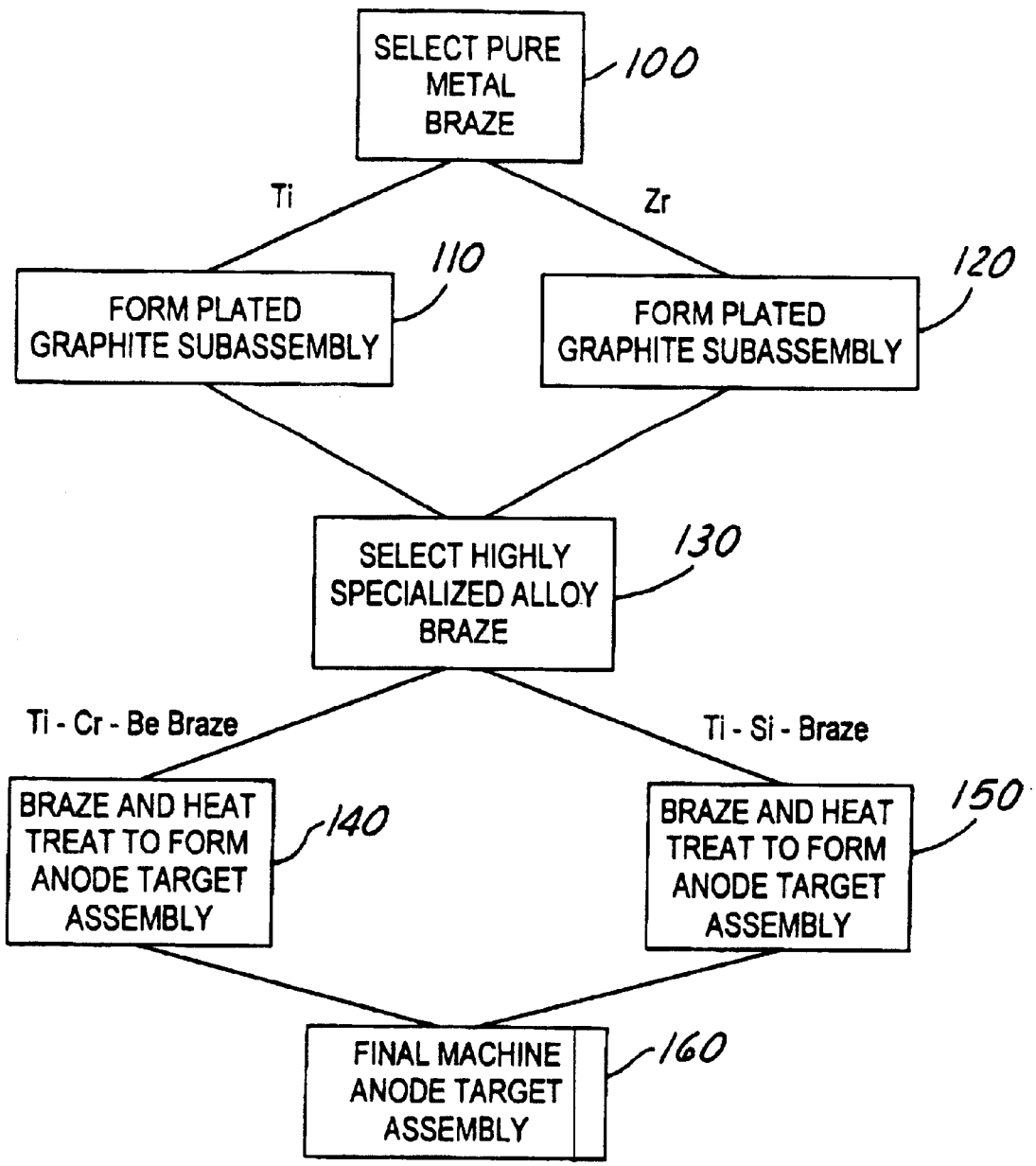
FIG. 4 is a logic flow diagram for forming the anode target assembly of FIG. 3.

FIG. 3 is a close-up view of the anode target assembly 60 of FIG. 2. Referring now to FIGS. 2 and 3, a first brazing step joins a thin molybdenum alloy sheet 40 to a graphite disk 42 using either a pure zirconium or pure titanium braze 44 to form a plated graphite subassembly 46. Preferably, the thin molybdenum alloy sheet 40 is approximately 0.5 mm thick. A second brazing step joins the subassembly 46 to a molybdenum alloy substrate 48 using a select group of highly specialized brazed alloys 50 to form the anode target assembly 60.

These highly specialized brazed alloys 50 are designed to have melt temperatures below the recrystallization temperature of the molybdenum alloy substrate 48 and remelt temperatures above the recrystallization temperature of the molybdenum alloy substrate. Two alloy brazes 50 are preferred. The first, hereinafter referred to as Ti—Cr—Be braze, is a mixture containing approximately 72 parts by weight titanium, 25 parts by weight chromium, and 3 parts by weight beryllium, and has a liquidus of approximately 1110 degrees Celsius. The second, hereinafter referred to as Ti—Si braze, is a mixture containing approximately 91.5 parts by weight titanium 8.5 parts by weight silicon, wherein the mixture has a liquidus of approximately 1200 degrees Celsius. After brazing, the remelt temperature for both of the alloy brazes 50 is approximately 1700 degrees Celsius due to the diffusion of molybdenum from the molybdenum alloy substrate 48 to the braze 50.

By reducing the temperature that the molybdenum alloy substrate 48 is exposed to in the razing steps below approximately 1200 degrees Celsius, which is the temperature at which the molybdenum alloy yield strength breaks down, higher yield strengths for the molybdenum alloy substrate 48 are obtained. These higher elevated temperature yield strength molybdenum alloy substrates 48 exhibit greater resistances to the possibility of tube failure by reducing the probability of fracture in the molybdenum alloy substrate 48/graphite disk 42 interface. The anode target assembly 60 consists of a molybdenum alloy substrate 48 that retains a significant amount of work imparted to it by forging joined to the graphite disk 42 using the two brazes 50, each with a service temperature at or near 1600 degrees Celsius.

Referring now to FIG. 4, a logic flow diagram for producing the anode target assembly 60 prior to attachment to the stem 24 is shown. First, in Step 100, a pure metal braze 44 is selected for brazing the graphite disk 42 to the molybdenum alloy sheet 40 to form the plated graphite subassembly 46. For a pure titanium braze, proceed to Step 110. For a pure zirconium braze, proceed to Step 120.

In Step 110, the pure titanium braze is placed between the graphite disk 42 and molybdenum sheet 40. The components are then placed into a high vacuum furnace at between 1700 and 1800 degrees Celsius for 3–4 minutes to melt the titanium braze and diffuse a portion of the molybdenum into the titanium braze. The components are then cooled, wherein the titanium braze material solidifies to form an integral bond between the graphite disk 42 and the molybdenum sheet 40 to form a plated graphite subassembly 46. The logic then proceeds to Step 130.

In Step 120, the pure zirconium braze is placed between the graphite disk 42 and molybdenum sheet 40. The components are then placed into a high vacuum furnace at between 1500 and 1600 degrees Celsius for 3–4 minutes to melt the zirconium braze and diffuse a portion of the molybdenum into the zirconium braze. The components are then cooled, wherein the zirconium braze material solidifies to form an integral bond between the graphite disk 42 and the molybdenum sheet 40 to form a plated graphite subassembly 46. The logic then proceeds to Step 130.

In Step 130, a highly specialized alloy braze 50 is selected for brazing the plated graphite subassembly 46 to the molybdenum alloy substrate 48 to form the anode target assembly 60. For Ti—Cr—Be braze, proceed to Step 140. For Ti—Si braze, proceed to Step 150.

In Step 140, the Ti—Cr—Be braze sheet is placed between the plated graphite subassembly 46 and the molybdenum alloy substrate 48 and brazed in a vacuum furnace at approximately 1110 degrees for 2–3 minutes. A three-step vacuum furnace diffusion heat treating process immediately follows the brazing step. This three step heat treating process consists of an eight hour hold at approximately 980 degrees Celsius followed by a second eight hour hold at 1095 degrees Celsius followed by a final forty hour hold at approximately 1120 degrees Celsius. Remelt of the braze joint will be approximately 1700 degrees Celsius after the three step diffusion heat treating process. The anode target assembly 60 is then cooled and removed from the furnace. The logic then proceeds to Step 160.

In Step 150, the Ti—Si braze sheet is placed between the plated graphite subassembly 46 and the molybdenum alloy substrate 48 and brazed in a vacuum furnace at approximately 1370 degrees for 2–3 minutes. A single step vacuum furnace diffusion heat treating process that consists of a two-hour hold at approximately 1200 degrees Celsius immediately follows the brazing step. Remelt of the braze joint will be approximately 1700 degrees Celsius after the diffusion heat treating process. The anode target assembly 60 is then cooled and removed from the furnace. The logic then proceeds to Step 160.

In Step 160, the anode target assembly 60 is final machined and ready for assembly to the bearing shaft 20.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. An anode target assembly for use in a rotating anode X-ray tube comprising:
    a graphite disk;
    a molybdenum alloy sheet;
    a first braze coupling said graphite disk to said molybdenum alloy sheet;
    a molybdenum alloy substrate; and
    a second braze alloy coupling said molybdenum alloy sheet to said molybdenum alloy substrate.

2. The anode target assembly of claim 1, wherein said molybdenum alloy sheet and said molybdenum alloy substrate comprises TZM.

3. The anode target assembly of claim 1, wherein said first braze comprises a pure metal braze.

4. The anode target assembly of claim 3, wherein said pure metal braze is selected from the group consisting of a pure titanium braze and a pure zirconium braze.

5. The anode target assembly of claim 1, wherein said second braze alloy has a melt temperature below the recrystallization temperature of said molybdenum alloy substrate and a remelt temperature after brazing above the recrystallization temperature of said molybdenum alloy substrate.

6. The anode target assembly of claim 1, wherein the composition of said second braze alloy contains approximately 72 parts by weight titanium, 25 parts by weight chromium, and 3 parts by weight beryllium.

7. The anode target assembly of claim 1, wherein the composition of said second braze alloy contains approximately 91.5 parts by weight titanium and 8.5 parts by weight silicon.

\* \* \* \* \*